United States Patent [19]
Bytwork

[11] 3,755,938
[45] Sept. 4, 1973

[54] GRAPHMATIC MAGNEGRAPH
[76] Inventor: Alvin J. Bytwork, Kalamazoo, Mich.
[22] Filed: June 14, 1971
[21] Appl. No.: 152,506

[52] U.S. Cl. .................... 40/102, 40/142 A, 35/7 A
[51] Int. Cl. .............................................. G09f 1/10
[58] Field of Search ................. 35/7 A, 24; 40/102, 40/142 A

[56] References Cited
UNITED STATES PATENTS
| | | | |
|---|---|---|---|
| 3,553,873 | 1/1971 | Weston | 40/156 |
| 3,228,133 | 1/1966 | Baermann | 35/7 A |
| 2,784,757 | 3/1957 | Bosca et al. | 402/503 |
| 3,124,501 | 3/1964 | Wise | 402/503 |

FOREIGN PATENTS OR APPLICATIONS
| | | | |
|---|---|---|---|
| 428,952 | 5/1935 | Great Britain | 35/7 A |
| 776,372 | 1/1968 | Canada | 37/7 A |

Primary Examiner—Robert W. Michell
Assistant Examiner—J. H. Wolff
Attorney—Woodhams, Blanchard & Flynn

[57] ABSTRACT

A visual display device has a pair of semirigid panels hingedly connected together along one edge and adapted to be folded into an overlapped and parallel position. The panels, when unfolded, are disposed with the inside surfaces of said panels facing outwardly. Magnetizable sheet means are provided having a substantially flat mounting surface, said magnetizable sheet means being secured to the inside surface of at least one of the panels so that the mounting surface faces outwardly from the panel. Releasable clamping means are also provided on the one sheet and is adapted to hold non-magnetic sheet means on the mounting surface. Magnetizable display members are provided with either the magnetizable sheet means or the magnetizable display members having a permanent magnet characteristic so that the display member will be magnetically attracted to the magnetizable sheet means.

5 Claims, 10 Drawing Figures

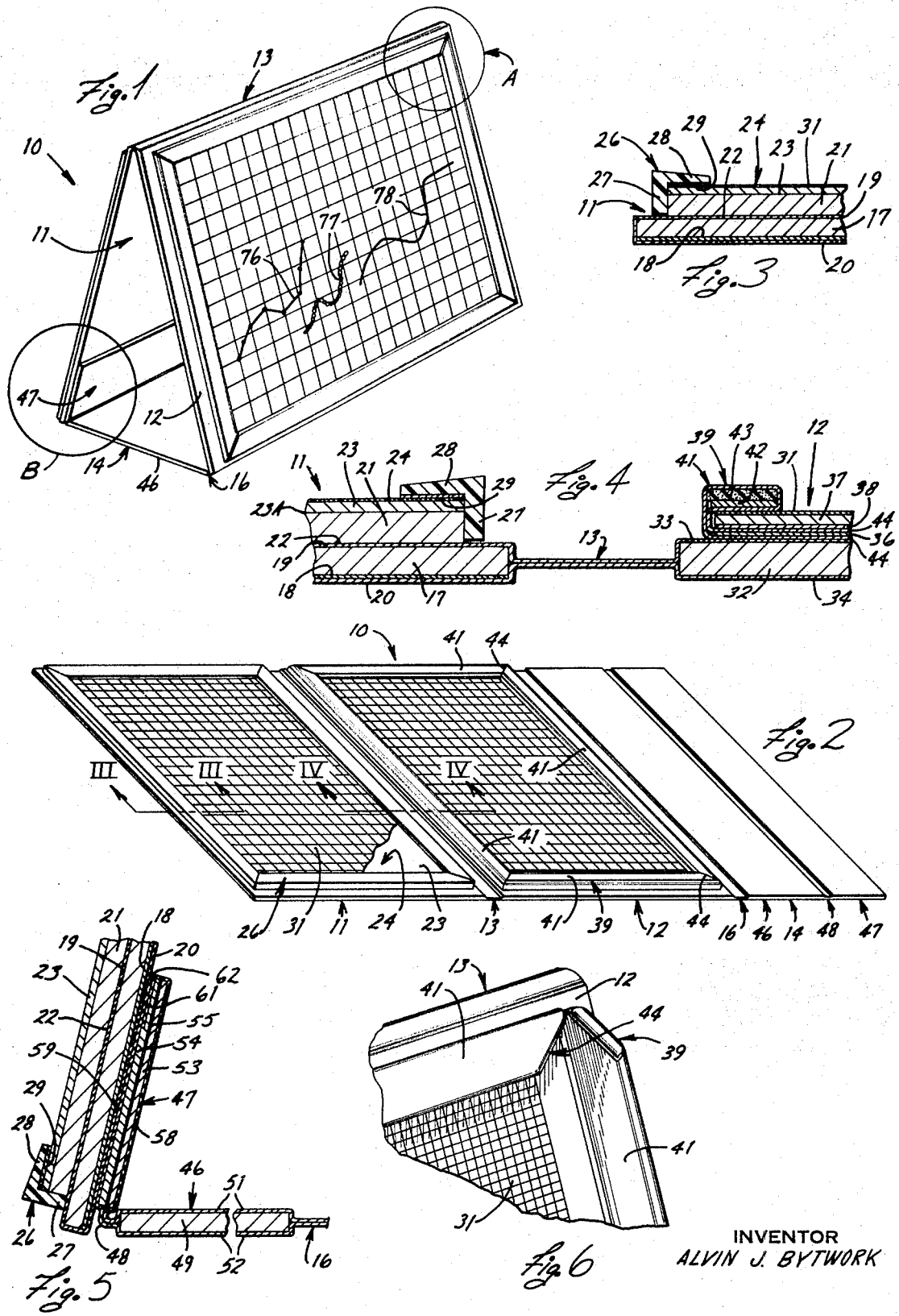

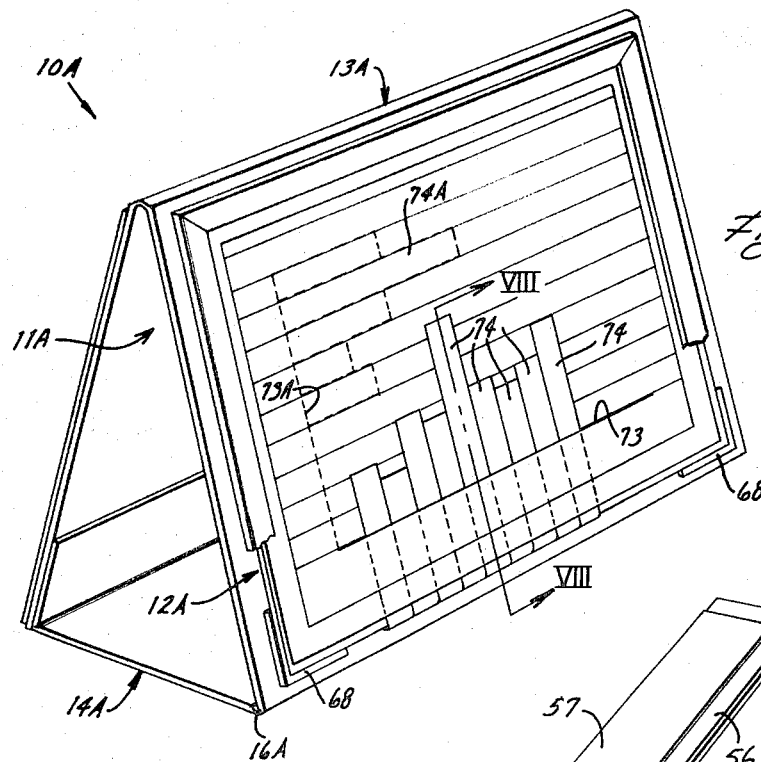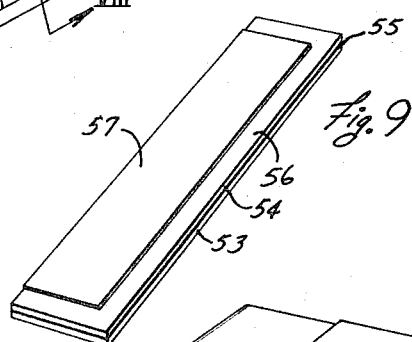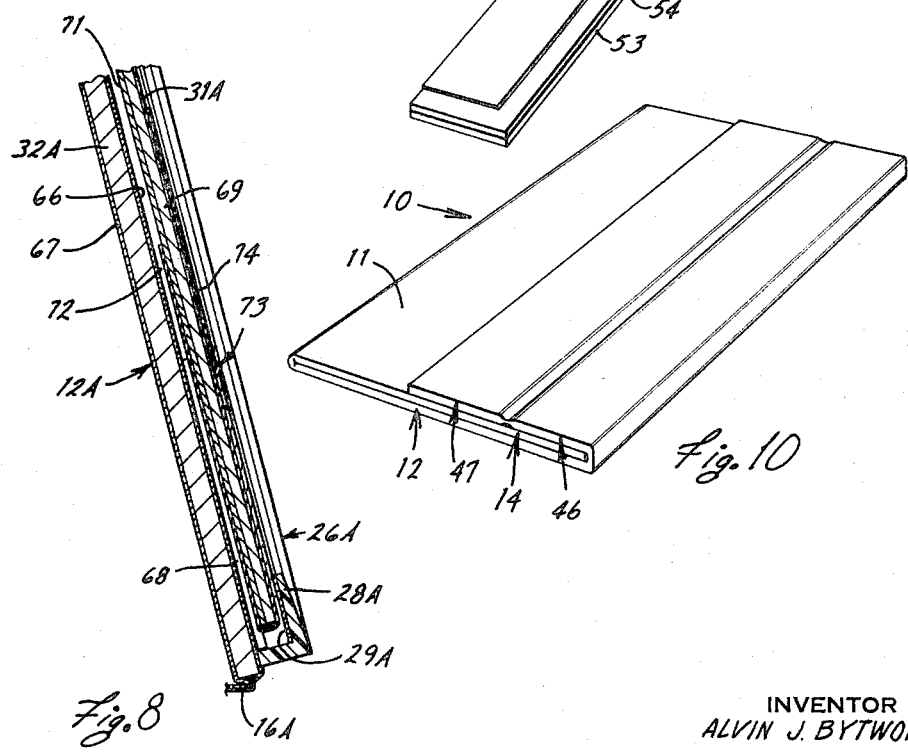

3,755,938

GRAPHMATIC MAGNEGRAPH

FIELD OF THE INVENTION

This invention relates to a visual display device, and more particularly, relates to a visual display device having display members of diverse character and which are removably held on the visual display device by magnetic force.

BACKGROUND OF THE INVENTION

There are virtually hundreds of visual display devices which are known in the prior art. However, none of the prior art visual display devices, as far as I am aware, are entirely satisfactory in situations where information is rapidly changing and it is desired to reflect the rapid change in information on a flat copyable visual display device without any appreciable inconvenience. For example, in the teaching profession, it is oftentimes desired to display various types of information to a classroom and demonstrate how various changes in the information, such as might be plotted on a graph, will effect the display. While various devices for permitting a quick and easy alteration of the information are known, the portability of such devices is not entirely satisfactory and is oftentimes difficult and quite complicated to set up for use.

Further, in situations involving marketing and sales of various products, it is oftentimes desired to present a demonstration of the marketing or sales characteristics of a particular product of products by plotting various types of marketing and sales information on a graph. This is often done during sales meetings with many personnel contributing information based on their past experience. In the teaching profession, it is oftentimes desired to be able to quickly and conveniently set up a visual display and then place the visual display in a photocopy machine so that multiple copies of the display can be made and distributed to the students in the classroom rather than relying on a visual display device located at some distance from the students so that various parts of the information may not be visible due to the small size of the characters utilized thereon. Further, the photocopy of the visual display enables the student to make notes on the photocopy while the instructor is lecturing. This same feature is also extremely advantageous in that it permits the quick preparation of information for marketing and sales meetings and that multiple photocopies can be made of certain desired information and then distributed to the personnel present at the meeting.

Further, there is no completely satisfactory visual display device, as far as I am aware, which may be folded up into a form which appears as a carrying case. Thus, information can be placed onto the visual display device in the desired manner at one location and then the device can be folded up into the form of a carrying case and transported to the location where the information is to be displayed.

Accordingly, the objects of this invention include:
1. To provide a visual display device incorporating a magnetized display board and ferromagnetic material-containing display members so that the display member will be magnetically attracted to the magnetized display board to permit a rapid change in the information displayed on the display board. 2. To provide a visual display device which comprises hinged panels which may be folded into a parallel position to form an enclosed carrying case and, when unfolded, the panels being disposed to expose the inside surfaces of each of the panels to permit information to be placed onto the display board mounted on at least one of the hinged panels. 3. To provide a visual display device having releasable clamping means thereon adapted to hold a nonmagnetic sheet, such as a sheet of paper having graphical indicia thereon, on the displaying surface of the magnetized display board. 4. To provide a visual display device which is capable of being folded for placement onto a photocopy machine so that multiple photocopies can be made of the information displayed on the display board, the magnetized display board holding the ferromagnetic material-containing display members in the proper position during the copying process. 5. To provide a visual display device which may be inexpensively manufactured using readily available components. 6. To provide a visual display device which is durable and which will withstand normal abuses applied to the device during the course of use thereof.

Other objects and purposes of this invention will be apparent to persons acquainted with display devices of this general type upon reading the following specification and inspecting the accompanying drawings, in which:

FIG. 1 is a perspective view of the visual display device in the open condition wherein the hinged panels are folded into a rigid triangular-shaped easel;

FIG. 2 is a view of the visual display device when the panels unfolded to a flat and parallel condition;

FIG. 3 is a sectional view taken along the line III—III of FIG. 2;

FIG. 4 is a sectional view taken along the line IV—IV of FIG. 2;

FIG. 5 is a an elongated sectional view of the encircled portion B in FIG. 1;

FIG. 6 is an enlarged fragmentary view of the portion of FIG. 1 enclosed in the circle marked A;

FIG. 7 is a perspective view of a modified embodiment;

FIG. 8 is a sectional view taken along the line VIII—VIII of FIG. 7;

FIG. 9 is a perspective view of the permanent magnet layer and steel sheet in the fastener panel; and FIG. 10 is a perspective view of the visual display device in the folded position thereby defining a carrying case.

Certain terminology will be used in the following description for convenience in reference only and will not be limiting. The words "up," "down," "right" and "left" will designate directions in the drawings to which reference is made. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a visual display device having a pair of semi-rigid panels hingedly connected together along one edge and adapted to be folded into an overlapping and parallel position. The panels, when unfolded, are disposable with the inside surfaces of the panels facing outwardly. Magnetizable sheet means having a large area and a substantially flat mounting surface is secured to the inside surface of at least one of the panels so that the mounting surface faces outwardly from the one panel. Releasable clamping means on the one panel is adapted to hold non-magnetic sheet means on the mounting surface. At least one magnetizable display member is provided with either the magnetizable sheet means or the magnetizable display member having a permanent magnet characteristic so that the display member will be magnetically attracted to the magnetizable sheet means.

DETAILED DESCRIPTION

Referring now to the drawings, FIG. 1 illustrates a visual display device 10 embodying the invention and has a pair of semirigid or rigid panels 11 and 12 hingedly interconnected at 13. A fastener member 14 is hingedly connected as at 16, to the panel 12 along an edge thereof remote from the hinge 13.

The panel 11 comprises a semirigid sheet of fiberboard 17 (FIGS. 3, 4 and 5) having a magnetizable sheet 18, such as a sheet of high permeability, ferromagnetic material, mounted along one surface thereof and secured thereto as by an adhesive. An inner and outer covering 19 and 20, respectively, is provided for covering the fiberboard sheet 17 and the magnetizable sheet 18. A sheet of fiberboard 21 is mounted on the inner surface 22 of the panel 11 and has an overall size slightly less than the size of the fiberboard sheet 17. A permanent magnet layer 23 having a large surface area and a substantially flat mounting surface 24 is secured to the upwardly facing surface of a steel sheet 23A by an adhesive and the steel sheet 23A is secured to the fiberboard sheet 21 also by an adhesive. The steel sheet 23A serves to increase the magnization of the mounting surface 24 by a sizable mount. However, it is to be recognized that the steel sheet 23A can be deleted without departing from the spirit of my invention.

The permanent magnet layer 23 can be a conventional type with a plurality of parallel alternate north and south magnetic poles extending along the mounting surface. One type of permanent magnet layer suitable for use in the present invention is formed from particles of high coercivity, low permeability permanent magnetic material and a thermoplastic binder with the particles dispersed throughout and bonded by the binder. The permanent magnet particles within the binder can be formed from but not limited to barium ferrite and the binder itself is flexible so that the permanent magnet layer can be formed by casting, extruding or milling in accordance with known procedures. By an appropriate magnetizing device, such as a plurality of single wires extending along the mounting surface 24, a plurality of opposite polarity, equally spaced magnetic poles may be provided on the mounting surface 24.

A unitary plastic frame 26 encircles the permanent magnet layer 23 and the fiberboard sheet 21 as illustrated in FIG. 2. The frame 26 is rectangular-shaped and has an L-shaped cross section (FIGS. 3, 4 and 5). The vertical leg 27 of the frame 26 encircles the permanent magnet layer 23 and a horizontal leg 28 extending generally perpendicularly away therefrom overlaps the permanent magnet layer 23. A strip of high permeability, ferromagnetic material 29 is secured as by an adhesive to the lower surface of the horizontal leg 28 as illustrated in FIGS. 3, 4 and 5. The length of the vertical leg 27 is sightly less than the combined thickness of the permanent magnet layer 23, the steel sheet 23A and the fiberboard sheet 21 so that the horizontal leg 28 of the frame 26 will be magnetically attracted, by reason of the ferromagnetic strip 29, to the permanent magnet layer 23.

If desired, a non-magnetizable sheet of material 31, such as paper, may be placed on the mounting surface 24 of the permanent magnet layer 23. It is preferable that the sheet of paper 31 have a size comparable to the size of the permanent magnet layer 23 so that when the frame 26 is placed over the permanent magnet layer 23, the horizontal leg 28 of the frame 26 will overlap the edges of the paper and clamp same between the leg 28 and the permanent magnet layer 23 to hold same firmly on the mounting surface 24.

The panel 12 comprises a semirigid sheet of fiberboard 32 having an inner covering 33 and an outer covering 34. The fiberboard sheet 32 is spaced from the fiberboard sheet 17 of the panel 11 and the inner and outer coverings 19, 20 and 33, 34 of the panels 11 and 12, respectively, are interconnected to define the aforementioned hinge 13. A sheet of fiberboard 36 is mounted on the surface of the panel 12 and is secured thereto by any conventional means, such as an adhesive. The fiberboard 36 is covered by a covering material 44. A permanent magnet layer 37 having a sheet of high permeability, ferromagnetic material, such as steel 38, adhered to one surface thereof, is mounted on the inner surface of the covering material 44. The permanent magnet layer 37 and the sheet of steel 38 may be loosely mounted on the inner surface of the covering material 44 or, and if desired, fixedly secured thereto by an adhesive.

A rectangular-shaped frame 39 is provided around the periphery of the permanent magnet layer 37 as illustrated in FIG. 2. The frame 39 comprises hinged flaps 41 on the four sides of the permanent magnet layer 37. The hinged flaps comprise a thin strip of high permeability, ferromagnetic material, such as steel 42 and a vinyl foam strip 43 secured to the upper surface thereof as illustrated in FIG. 4. The steel strip and the vinyl foam strip extend nearly the full length of each edge of the permanent magnet layer 37. The steel strip 42 and the vinyl foam strip 33 are covered by the outer edges of the covering material 44 secured to the panel 12 by an adhesive. The hinged flap 41 is movable from a closed position wherein the steel strip 42 is parallel to and is magnetically attracted to the permanent magnet layer 37 to an opened position wherein the hinged flap 41 is open, that is, inclined at an angle to the permanent magnet layer 37 and the steel strip 42 is not magnetically attracted very much to the permanent magnet layer 37. If desired, a sheet of non-magnetizable material 31, such as paper, may be mounted on the mounting surface of the permanent magnet layer 37. When the hinged flaps 41 are in the closed position, the piece of paper 31 will be clamped between the steel strips 42 and the permanent magnet layer 37. In order to improve the appearance of the hinged flaps 41, the corners where one hinged flap 41 abuts another hinged flap are mitered as at 44.

The fastener member 14 comprises a pair of panels 46 and 47 hingedly connected as at 48. More particularly, the panel 46 comprises a rigid sheet of fiberboard 49 having a width approximately equal to the width of the fiberboard sheets 17 and 32 of the panels 11 and 12, respectively, and a length appreciably less than the length of each of the fiberboard sheets 17 and 32. An inner and outer covering 51 and 52, respectively, is provided for covering the fiberboard sheet 49. In this particular embodiment, the inner and outer coverings 51 and 52 are integrally connected to the inner and outer coverings 33 and 34, respectively, of the panel 12 to define the hinged connection 16.

The panel 47 (FIG. 5) comprises a sheet of rigid fiberboard 53 and a permanent magnet layer 54 secured to a steel sheet 55. The permanent magnet layer 54 (FIG. 9) has a recess 56 provided in the upper surface 57 along three sides thereof. The depth of the recess is preferably equal to or slightly greater than the thickness of the covering material. An inner covering 58 and an outer covering 59 are provided to cover the fiberboard sheet 53 and the permanent magnet 54. An edge 61 of the inner covering 58 is positioned in the recess 56 in the permanent magnet layer 54 and the edge 62 of the outer cover 59 is secured to the outer surface of the edge 61 by an adhesive so that the outer covering 59 is flat. Thus, when the permanent magnet layer 54 is positioned parallel to the steel sheet 18, the upper surface area 57 of the permanent magnet layer 54 will be closely associated with the steel sheet 18 in the panel 11 to cause the panel 47 to be magnetically attracted to the panel 11.

Referring now to the modified embodiment in FIGS. 7 and 8, the visual display device 10A will be referred to by the same reference numerals designating corresponding parts of the visual device 10 with the suffix A added thereto. The visual display device 10A has a pair of rigid panels 11A and 12A hingedly interconnected at 13A. A fastener member 14A is hingedly connected as at 16A to the panel 12A along an edge thereof remote from the hinge 13A.

The panel 12A comprises a rigid sheet of fiberboard 32A having some inner covering 66 and an outer covering 67. A plurality of support pads 68 are secured to the inner surface of the panel 12A adjacent the four corners thereof. A permanent magnet layer 69 having a high permeability, ferromagnetic sheet backing, here a steel sheet 71, is mounted on the support pads 68. In this particular embodiment, the steel sheet 71 is adhesively secured to each of the support pads 68. The permanent magnet layer 69 is held by adhesive to the steel sheet 71 to hold same on the panel 12A. The permanent magnet layer 69 and the steel sheet 71 are spaced from the inner covering 66 to define a gap 72 therebetween. If desired, a sheet of graph paper 31A may be mounted on the mounting surface of the permanent magnet layer 69, which sheet of graph paper 31A has a slit 73 therein defining a coordinate for a two coordinate graph. A flexible strip of high permeability, ferromagnetic material is adapted to be magnetically attracted to the permanent magnet layer 69 and extend through the slit 73 in the paper 31A. The strip 74 is slidable through the slit 73 in a vertical direction to vary the height of the upper end of the strip relative to the slit or coordinate 73. The end of the strip 74 which extends beyond the lower edge of the permanent magnet layer 69 is adapted to be bent under and placed into the gap 72 between the permanent magnet layer 69 and the inner covering 66 on the panel 12A. The frame 26A having a strip of high permeability, ferromagnetic material 29A in the leg 28A thereof serves to hold the paper 31A in a fixed position on the mounting surface of the permanent magnet layer 69. It is to be recognized that the slit 73 may be also located at any position on the mounting surface of the permanent magnet layer 69, such as the vertical position 73A (illustrated in broken lines in FIG. 7) so that the flexible ferromagnetic strips 74A are extendible in a horizontal direction rather than in a vertical direction as is the case with the ferromagnetic strips 74.

OPERATION

Although the operation and use of the visual display device described above will be understood from the foregoing description by skilled persons, a summary of such description is now given for convenience.

When it is desired to transport the visual display device from one location to another, it may be folded so that the panels 11 and 12 and the fastener member 14 are overlapped and parallel to one another as illustrated in FIG. 10. The permanent magnet layer 54 in the panel 47 of the fastener member 14 is magnetically attracted to the steel sheet 18 in the panel 11 to hold the visual display device 10 in the closed and folded condition to define a carrying case.

When it is desired to set up a visual display, the panel 11 and the fastener member 14 are moved from the position illustrated in FIG. 10 to the position illustrated in FIG. 2 wherein the panels 11 and 12 and the fastener member 14 are essentially coplanar. Thereafter, the panels 11 and 12 are moved to define an inverted V-shape (FIG. 1) and the panel 4b of the fastener member 14 is moved across the angle defined by the V so that the panel 46 extends generally horizontally between the lower ends of the panels 11 and 12. The permanent magnet layer 54 in the panel 47 extends generally parallel to the panel 11 and is magnetically attracted to the steel sheet 18 to maintain the visual display device in a rigid triangular form thereby defining an easel.

A plurality of display members 76, 77 and 78, all of a flexible, high permeability, ferromagnetic material, are mountable on the mounting surface of the permanent magnet layer provided on each of the panels 11 and 12 to effectively display various types of information. It is to be recognized that other types of nonflexible display members may be utilized, if desired, with the visual display devices 10 and 10A.

If desired, the frame 26 may be removed from the permanent magnet layer 23 and a sheet of paper 31 (or 31A) may be placed on the mounting surface of the permanent magnet layer. Thereafter, the frame 26 may be replaced to clamp the piece of paper between the horizontal leg 28 (or 28A) of the frame 26 and the permanent magnet layer 23. The magnetic field generated by the permanent magnet layer 23 is sufficient to hold the display members 76, 77 and 78 on the paper.

Similarly, a sheet of paper may be placed onto the mounting surface of the permanent magnet layer 37 on the panel 12. This is accomplished by first pivoting the hinged flaps 41 to the oepned position (one of which is illustrated in FIG. 6) to permit a piece of paper 31 (or 31A) to be mounted on the mounting surface of the permanent magnet layer 37. Thereafter, the hinged flaps 41 may be pivoted so that the steel strips 42 become magnetically attracted to the permanent magnet layer 37 to thereby clamp the sheet of paper therebetween.

Although particular preferred embodiments of the invention have been disclosed in detail for illustrative The embodiments of the invention in which an exclusive property or privilege is claimed are defined as follows:

1. A foldable visual display device, comprising:

an elongated rectangular element;

first, second and third hinge means dividing said element into four mutually adjacent rigid panels, first and second ones of said panels being substantially equal in size and larger than each of the third and fourth ones of said panels, each of said panels being foldable relative to the other panel about said first, second and third hinge axes from a flat arrangement wherein each of said panels are parallel and overlapped to a position wherein said first and second panels define an inverted V-shape about said first hinge means, said third panel adjacent said second panel being foldable about said second hinge means to close the spacing between said first and second panels at the open end of said V-shape and thereby define a triangular arrangement, said fourth panel adjacent said third panel being foldable about said third hinge means to extend parallel with an inside surface portion of said first panel of said triangular arrangement and having means for effecting engagement of said third panel with said inside surface portion;

a rectangular magnetized sheet and means for securing said magnetized sheet on at least one of said first or second panels and substantially coextensive therewith and on a side thereof facing outwardly of said triangular arrangement; and a plurality of elongated flaps, each of said flaps being attached adjacent one of said sides of said magnetized sheet, means for hingedly connecting each of said flaps to said one of said first or second panels along the line of attachment, each of said flaps being pivotal between positions out of parallel relation with said magnetized sheet and a position of parallel and overlying relation with said magnetized sheet, each of said flaps having a magnetizable portion thereon which is magnetically attracted to said magnetized sheet when said flaps are in said overlying relation to said magnetized sheet to effect a clamping action on a rectangular display sheet juxtaposed between said magnetized sheet and said elongated flaps.

2. The visual display device according to claim 1, including at least one magnetizable display member magnetically attractable to said magnetized sheet.

3. A visual display device according to claim 2, wherein said magnetizable portion of each of said flaps comprise a strip of ferromagnetic material movable about the hinge means associated therewith into and out of major magnetic attraction with said magnetized sheet and spacer means mounted on said ferromagnetic strip on the side thereof remote from magnetized sheet to prevent a disturbance of said display member when said panels are folded in said overlapped and parallel position.

4. A visual display device according to claim 2, wherein said inside surface of said first panel includes a sheet of ferromagnetic material; and wherein said fourth panel has a permanently magnetized sheet thereon;

whereby said permanently magnetized sheet on said fourth panel is magnetically attracted to said ferromagnetic sheet on said first panel and adapted to maintain said panels of said visual display device in said parallel and overlapping arrangement and in said triangular arrangement.

5. A visual display device according to claim 2, including further spacer means for spacing said magnetized sheet from said one of said panels to define a gap therebetween; and wherein said display member comprises an elongated flexible strip of ferromagnetic material, one end of said strip being received in said gap and the other end thereof being magnetically attracted to said magnetized sheet on said display sheet.

* * * * *